United States Patent
Kato et al.

(10) Patent No.: US 7,690,472 B2
(45) Date of Patent: Apr. 6, 2010

(54) TRANSMISSION FOR OFF-ROAD VEHICLE

(75) Inventors: Eiji Kato, Shizuoka (JP); Rusty Hayes, Sharpsburg, GA (US); Colby Nash, Newnan, GA (US); Joel Cheek, Newnan, GA (US)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 356 days.

(21) Appl. No.: 11/775,442

(22) Filed: Jul. 10, 2007

(65) Prior Publication Data

US 2008/0015065 A1    Jan. 17, 2008

Related U.S. Application Data

(63) Continuation of application No. 10/803,274, filed on Mar. 18, 2004, now Pat. No. 7,438,147.

(60) Provisional application No. 60/459,946, filed on Apr. 2, 2003.

(51) Int. Cl.
*B60K 1/00* (2006.01)

(52) U.S. Cl. ..................... 180/291; 180/292

(58) Field of Classification Search .......... 180/68.3, 180/68.1, 68.2, 291, 292, 220; 123/41.56, 123/41.58, 41.62, 41.7
See application file for complete search history.

(56) References Cited

U.S. PATENT DOCUMENTS

| | | | |
|---|---|---|---|
| 438,644 A | 10/1890 | Robertson | |
| 957,626 A | 5/1910 | Rivers | |
| 1,852,464 A | 4/1932 | Leipert | |
| 2,053,869 A | 9/1936 | Hatenberger | |
| 2,064,100 A | 12/1936 | Bachman | |
| 2,145,545 A | 1/1939 | Johnson et al. | |
| 2,315,317 A | 3/1943 | Copp et al. | |
| 2,331,976 A | 10/1943 | Hare | |
| 2,707,402 A | 5/1955 | Blair | |
| 2,718,409 A | 9/1955 | Kishline et al. | |
| 2,751,992 A | 6/1956 | Nallinger | |
| 2,792,498 A | 5/1957 | Pewitt | |
| 2,850,852 A | 9/1958 | Hofberger | |
| 3,147,814 A | 9/1964 | Suhre | |
| 3,149,856 A | 9/1964 | Schilberg | |
| 3,229,424 A | 1/1966 | Fairchok | |
| 3,419,098 A | 12/1968 | Mayers et al. | |
| 3,650,344 A | 3/1972 | Plessinger et al. | |

(Continued)

FOREIGN PATENT DOCUMENTS

AT    171825    12/1951

(Continued)

OTHER PUBLICATIONS

ATV 1998 Yamaha Catalogue, Information about Breeze, 8 pages.
ATV 1998 Yamaha Catalogue, Information about Grizzly 4WD; 8 pages.

*Primary Examiner*—Hau V Phan
(74) *Attorney, Agent, or Firm*—Keating & Bennett, LLP

(57) ABSTRACT

An off-road vehicle includes a frame and wheels. An engine of the vehicle has a crankshaft. A transmission transmits the rotation of the crankshaft to the wheels. A housing houses a transmission mechanism of the transmission. The housing has an air inlet duct through which ambient air enters the housing and an air outlet duct through which the air leaves the housing. The air inlet duct has an inlet opening. The outlet duct has an outlet opening. The inlet and outlet openings are positioned higher than the wheels.

19 Claims, 10 Drawing Sheets

U.S. PATENT DOCUMENTS

| | | | |
|---|---|---|---|
| 3,709,314 A | 1/1973 | Hickey | |
| 3,733,918 A | 5/1973 | Domaas | |
| 3,943,785 A | 3/1976 | Percifield | |
| 4,249,631 A | 2/1981 | Huneke | |
| 4,350,124 A | 9/1982 | Kitano et al. | |
| 4,354,570 A | 10/1982 | Tanaka et al. | |
| 4,496,019 A | 1/1985 | Tanaka | |
| 4,497,285 A | 2/1985 | Kondo | |
| 4,531,928 A | 7/1985 | Ikenoya | |
| 4,534,442 A | 8/1985 | Botar | |
| 4,597,466 A | 7/1986 | Yamada | |
| 4,600,074 A | 7/1986 | Watanabe et al. | |
| 4,632,071 A | 12/1986 | Arai et al. | |
| 4,650,029 A | 3/1987 | Foote et al. | |
| 4,671,373 A | 6/1987 | Sigl | |
| 4,681,185 A | 7/1987 | Hoernig | |
| 4,697,665 A | 10/1987 | Eastman et al. | |
| 4,733,639 A | 3/1988 | Kohyama et al. | |
| 4,735,275 A | 4/1988 | Tsukahara et al. | |
| 4,744,432 A | 5/1988 | Shibata et al. | |
| 4,751,856 A | 6/1988 | Nakamura | |
| 4,765,434 A | 8/1988 | Kawamoto | |
| 4,773,675 A | 9/1988 | Kosuge | |
| 4,792,012 A | 12/1988 | Morisawa | |
| 4,798,400 A | 1/1989 | Kosuge | |
| 4,815,550 A | 3/1989 | Mather et al. | |
| 4,817,985 A | 4/1989 | Enokimoto et al. | |
| 4,821,685 A | 4/1989 | Matsushima et al. | |
| 4,883,138 A | 11/1989 | Kameda | |
| 4,895,217 A | 1/1990 | Hueckler et al. | |
| 4,951,964 A | 8/1990 | Sakamoto et al. | |
| 4,953,525 A | 9/1990 | Sakurai et al. | |
| 4,955,853 A | 9/1990 | Bausch | |
| 5,005,663 A | 4/1991 | Niide | |
| 5,044,646 A | 9/1991 | Liga et al. | |
| 5,054,573 A | 10/1991 | Bennett | |
| 5,054,842 A | 10/1991 | Ishiwatari et al. | |
| 5,071,392 A | 12/1991 | Stall | |
| 5,086,858 A | 2/1992 | Mizuta et al. | |
| 5,101,924 A | 4/1992 | Yamagiwa et al. | |
| 5,107,952 A | 4/1992 | Matsubayashi et al. | |
| 5,125,490 A | 6/1992 | Suzumura | |
| 5,152,365 A | 10/1992 | Aoshima | |
| 5,169,171 A | 12/1992 | Ban et al. | |
| 5,195,607 A | 3/1993 | Shimada et al. | |
| 5,251,713 A | 10/1993 | Enokimoto | |
| 5,257,672 A | 11/1993 | Ohtagaki | |
| 5,314,378 A | 5/1994 | Ohtagaki | |
| 5,327,989 A | 7/1994 | Furuhashi et al. | |
| 5,366,041 A | 11/1994 | Shiraishi | |
| 5,401,056 A | 3/1995 | Eastman | |
| 5,431,429 A | 7/1995 | Lee | |
| 5,451,188 A | 9/1995 | Kraft et al. | |
| 5,498,019 A | 3/1996 | Adato | |
| 5,505,267 A | 4/1996 | Orbach | |
| 5,575,352 A | 11/1996 | Suzuki et al. | |
| 5,577,747 A | 11/1996 | Ogawa et al. | |
| 5,775,455 A | 7/1998 | Cho | |
| 5,873,428 A | 2/1999 | Ohshita et al. | |
| 5,902,489 A | 5/1999 | Yasuda | |
| 5,915,727 A | 6/1999 | Bonnville | |
| 5,950,478 A | 9/1999 | Sato et al. | |
| 5,950,748 A | 9/1999 | Matsumoto et al. | |
| 5,980,415 A | 11/1999 | Showalter | |
| 6,016,883 A | 1/2000 | Yamada | |
| 6,038,506 A | 3/2000 | Diekhans | |
| 6,047,988 A | 4/2000 | Aloe et al. | |
| 6,076,624 A | 6/2000 | Izumi et al. | |
| 6,085,138 A | 7/2000 | Smith | |
| 6,105,702 A | 8/2000 | Showalter | |
| 6,108,601 A | 8/2000 | Breithor | |
| 6,155,371 A | 12/2000 | Izumi | |
| 6,170,875 B1 | 1/2001 | Jones et al. | |
| 6,202,777 B1 | 3/2001 | Surridge | |
| 6,269,899 B1 | 8/2001 | Izumi | |
| 6,273,074 B1 | 8/2001 | Kawamata | |
| 6,386,310 B2 | 5/2002 | Honzek | |
| 6,405,823 B1 | 6/2002 | Fukamachi et al. | |
| 6,454,040 B1 | 9/2002 | Fukuda | |
| 6,502,659 B2 | 1/2003 | Akasaka | |
| 6,510,912 B1 | 1/2003 | Atsuumi | |
| 6,523,634 B1 | 2/2003 | Gagnon et al. | |
| 6,533,060 B1 | 3/2003 | Seto | |
| 6,547,023 B2 | 4/2003 | Laimbock | |
| 6,557,661 B1 | 5/2003 | Hurlburt | |
| 6,582,004 B1 | 6/2003 | Hamm | |
| 6,595,312 B2 | 7/2003 | Yoshioka | |
| 6,622,806 B1 | 9/2003 | Matsuura | |
| 6,626,260 B2 | 9/2003 | Gagnon et al. | |
| 6,648,093 B2 | 11/2003 | Rioux et al. | |
| 6,675,925 B2 | 1/2004 | Takahashi et al. | |
| 6,691,815 B2 | 2/2004 | Rioux et al. | |
| 6,695,083 B2 | 2/2004 | Nakamura et al. | |
| 6,695,086 B2 | 2/2004 | Kawamoto | |
| 6,702,058 B2 | 3/2004 | Ishii et al. | |
| 6,729,830 B2 | 5/2004 | Wagner et al. | |
| 6,732,830 B2 | 5/2004 | Gagnon | |
| 6,767,022 B1 | 7/2004 | Chevalier | |
| 6,874,590 B2 | 4/2005 | Rondeau et al. | |
| 6,896,087 B2 | 5/2005 | Korenjak et al. | |
| 6,902,022 B2 | 6/2005 | Mathukia | |
| 6,916,142 B2 * | 7/2005 | Hansen et al. | 410/77 |
| 6,920,949 B2 | 7/2005 | Matsuura et al. | |
| 7,147,075 B2 | 12/2006 | Tanaka et al. | |
| 2001/0013440 A1 | 8/2001 | Izumi et al. | |
| 2001/0045312 A1 | 11/2001 | Adachi et al. | |
| 2002/0000340 A1 | 1/2002 | Laimbock | |
| 2002/0027038 A1 | 3/2002 | Rioux et al. | |
| 2002/0063005 A1 | 5/2002 | Klais | |
| 2002/0070066 A1 | 6/2002 | Nakamura | |
| 2002/0117843 A1 | 8/2002 | Rasidescu et al. | |
| 2002/0125057 A1 | 9/2002 | Kitai et al. | |
| 2002/0139598 A1 | 10/2002 | Miguchi | |
| 2003/0146033 A1 | 8/2003 | Malmstrom | |
| 2003/0173132 A1 | 9/2003 | Komatsu | |
| 2004/0124029 A1 | 7/2004 | Takenaka et al. | |
| 2004/0195034 A1 | 10/2004 | Kato et al. | |
| 2004/0206567 A1 | 10/2004 | Kato et al. | |
| 2004/0216942 A1 | 11/2004 | Takenaka et al. | |
| 2005/0103553 A1 | 5/2005 | Korenjak et al. | |
| 2005/0109554 A1 | 5/2005 | Ishikawa et al. | |
| 2005/0126842 A1 | 6/2005 | Rasidescu et al. | |
| 2005/0150706 A1 | 7/2005 | Eguchi et al. | |
| 2005/0230209 A1 | 10/2005 | Duignan | |

FOREIGN PATENT DOCUMENTS

| | | |
|---|---|---|
| GB | 164 051 | 7/1920 |
| JP | 31-19213 | 12/1956 |
| JP | 57-58332 | 12/1982 |
| JP | 58-15230 | 3/1983 |
| JP | 58-44255 | 3/1983 |
| JP | 59-39920 | 3/1984 |
| JP | 59-77924 | 5/1984 |
| JP | 61-13093 | 4/1986 |
| JP | 61-89187 | 5/1986 |
| JP | 05-57955 | 8/1993 |
| JP | 06-34213 | 9/1994 |
| JP | 10-035314 | 2/1998 |
| JP | 10-035315 | 2/1998 |
| JP | 2000-103246 | 4/2000 |

* cited by examiner

TRANSMISSION FOR OFF-ROAD VEHICLE

PRIORITY INFORMATION

The present application is a Continuation of U.S. patent application Ser. No. 10/803,274, filed Mar. 18, 2004, which is based on and claims the benefit of U.S. Provisional Application No. 60/459,946, filed on Apr. 2, 2003, under 35 U.S.C. §119(e).

BACKGROUND OF THE INVENTIONS

1. Field of the Inventions

The present inventions generally relate to a transmission for an off-road vehicle, and more particularly to a transmission for an off-road vehicle that is cooled by ambient air.

2. Description of Related Art

Off-road vehicles are designed to be operated over rugged terrain. These vehicles are often operated on unpaved terrain such as, for example, steep inclines and declines, rough roads, and areas covered in mud and water.

The off-road vehicles typically include a frame that is supported by wheels. In one common arrangement, the vehicle has four wheels, i.e., a pair of front wheels and a pair of rear wheels. An internal combustion engine is employed to power at least the rear or front wheels, and most commonly, all of the wheels. Typically, the engine is combined with a transmission to form an engine unit. The transmission transfers power to an output shaft from a crankshaft of the engine. The output shaft drives the wheels through a drive mechanism. The off-road vehicle has a seat unit on which a driver and/or a passenger sit.

In some arrangements of conventional off-road vehicles, the transmission (e.g., a continuously variable transmission) includes an endless belt which links a variable pulley mechanism. A transmission case houses the belt and the pulley mechanism. Heat produced by friction occurs when the belt runs on the pulley mechanism and such heat can deteriorate the belt. In order to inhibit belt deterioration, the transmission can be provided with a cooling system that introduces air into the case and discharges the air to an external location outside of the case. See, for example, U.S. Pat. No. 5,086,858, which discloses an off-road vehicle that employs such a cooling system. The cooling system disclosed in U.S. Pat. No. 5,086,858, however, is susceptible to water intrusion under some operating conditions. Accordingly, in such an arrangement water can enter the case and damage the belt and the pulley mechanism.

SUMMARY OF THE INVENTIONS

One aspect of at least one of the present inventions involves an off-road vehicle comprising a frame. A plurality of wheels is arranged to support the frame. An internal combustion engine has a crankshaft configured to rotate. A transmission is arranged to transmit the rotation of the crankshaft to at least one of the wheels. A housing is configured to house at least a portion of the transmission. The housing has an air inlet duct through which ambient air enters the housing and an air outlet duct through which the air leaves the housing. The air inlet duct has an inlet opening. The outlet duct has an outlet opening. The inlet and outlet openings are positioned higher than the wheels.

In accordance with another aspect of at least one of the present inventions, an off-road vehicle comprises a frame. A plurality of wheels is arranged to support the frame. An internal combustion engine has a crankshaft configured to rotate. A transmission is arranged to transmit the rotation of the crankshaft to at least one of the wheels. A housing is configured to house at least a portion of the transmission. Means are provided for introducing ambient air into the housing and discharging the air from the housing and for inhibiting water from entering the housing.

In accordance with a further aspect of at least one of the present inventions, an off-road vehicle comprises a frame. A plurality of wheels is arranged to support the frame. An internal combustion engine has a crankshaft configured to rotate. A transmission is arranged to transmit the rotation of the crankshaft to at least one of the wheels. A housing is configured to house at least a portion of the transmission. The housing has an air inlet duct through which ambient air enters the housing and an air outlet duct through which the air leaves the housing. The air inlet duct has an inlet opening. The air outlet duct has an outlet opening. A seat defines a sitting surface on which a driver or passenger of the vehicle sits. The inlet opening is positioned at generally the same elevation as or higher than the sitting surface. The outlet opening is positioned close to the elevation as the sitting surface.

In accordance with another embodiment, an off-road vehicle can comprise a frame, a plurality of wheels arranged to support the frame, and an internal combustion engine having a crankcase housing a crankshaft configured to rotate and a cylinder block connected to the crankcase. A transmission can be arranged to transmit the rotation of the crankshaft to at least one of the wheels, and a v-belt transmission housing can be disposed to a lateral side of the crankcase, a shift lever disposed forward from the cylinder block and laterally to a side of the v-belt transmission housing.

In accordance with yet another embodiment, an off-road vehicle can comprise a frame, at least four wheels supporting the frame, and an internal combustion engine having a crankcase housing a crankshaft configured to rotate and a cylinder block connected to the crankcase, the cylinder block being disposed toward a rearward end of the engine. At least a first seat can be supported by the frame and disposed on a left side of the internal combustion engine and at least a second seat can be supported by the frame and disposed on a right side of the engine. A transmission can be configured to transmit the rotation of the crankshaft to at least one of the wheels. The transmission can comprise a v-belt arrangement and a v-belt transmission housing disposed to a lateral side of the crankcase. The transmission can also include a change speed transmission mechanism configured to shift the transmission between at least a parking state, a neutral state, a forward state, and a reverse state, and the change speed transmission mechanism can be disposed at a forward end of the engine. An exhaust system can be configured to guide exhaust gases away from the engine. Additionally, a shift lever can be operatively connected to the change speed transmission mechanism, and it can be disposed at the forward end of the engine above the change speed transmission mechanism and between the first and second seats.

BRIEF DESCRIPTION OF THE DRAWINGS

The foregoing and other features, aspects and advantages of the present inventions are described in detail below with reference to the drawings of a preferred embodiment which is intended to illustrate and not to limit the inventions. The drawings comprise twelve figures in which.

DETAILED DESCRIPTION OF THE PREFERRED EMBODIMENT

With reference to FIGS. 1-7, an overall construction of an off-road vehicle is described. While the embodiment is described in connection with this particular type of vehicle, those of skill in the art will appreciate that certain features, aspects and advantages of the present inventions may have utility in a wide range of applications for other vehicles, for example, with snowmobiles, tractors, utility vehicles and the like.

Figure 1:
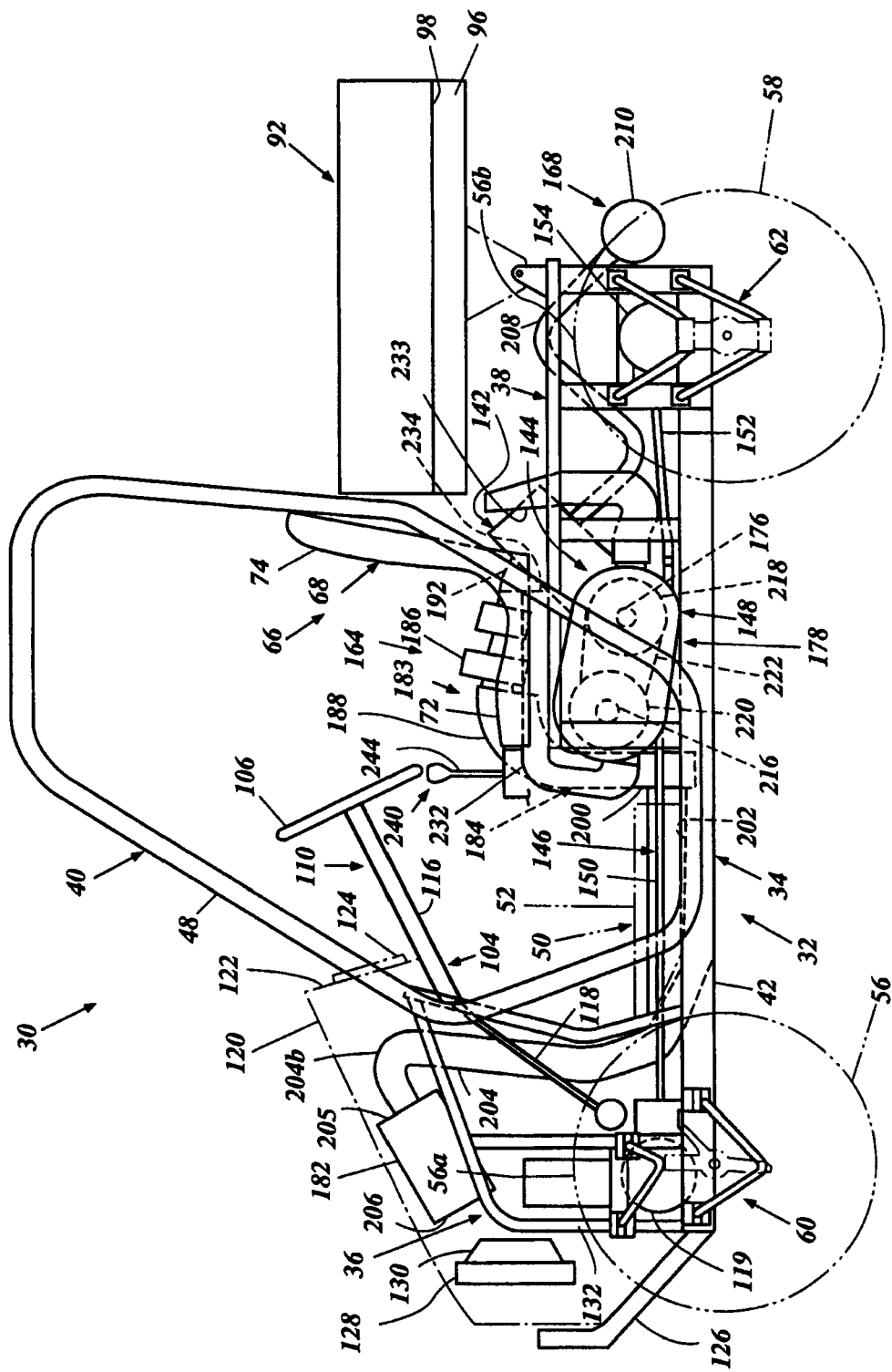
FIG. 1 is a side elevational view of an off-road vehicle configured in accordance with certain features, aspects and advantages of the present inventions.
Figure 2:
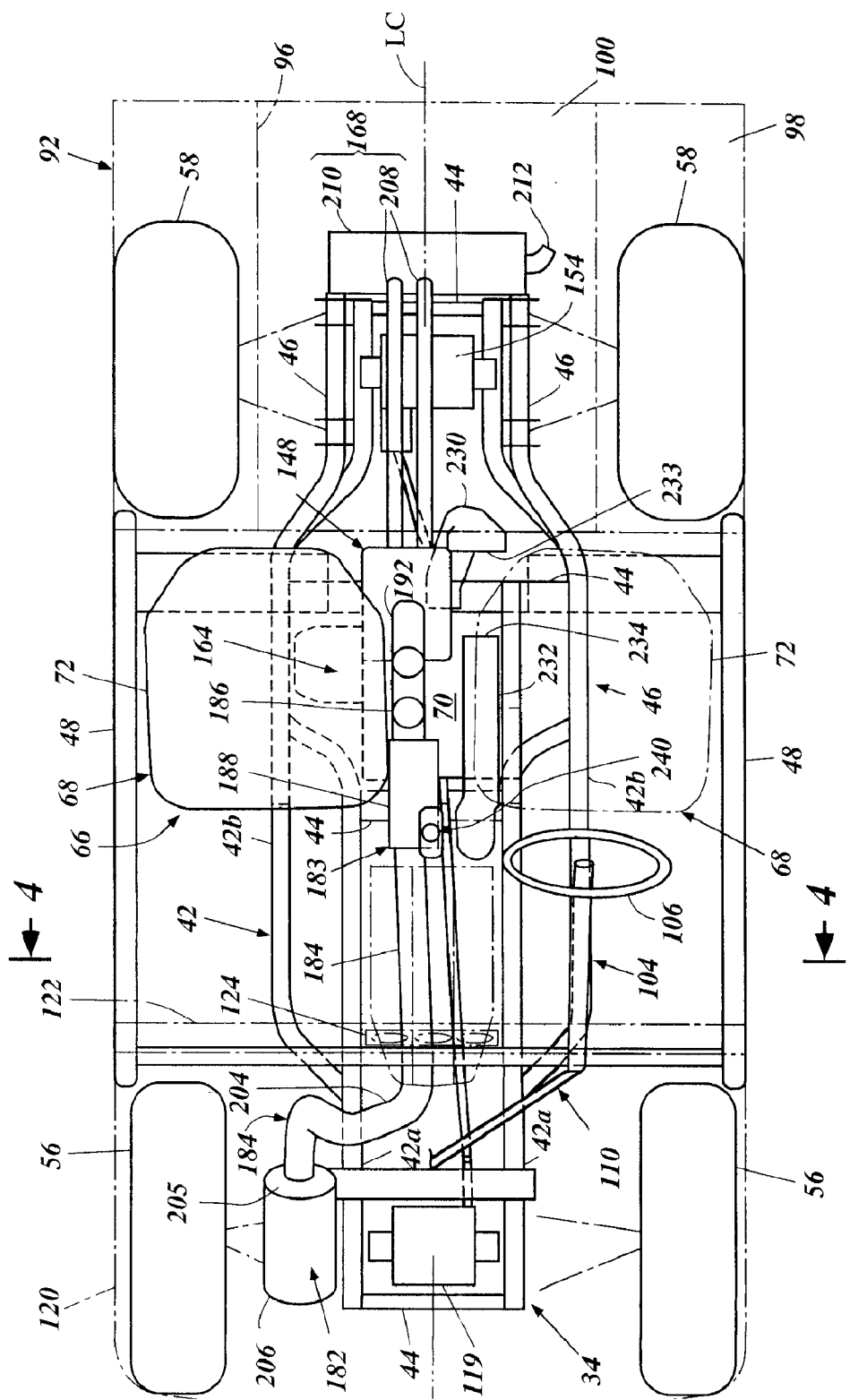
FIG. 2 is a top plan view of the off-road vehicle of FIG. 1.
Figure 4:
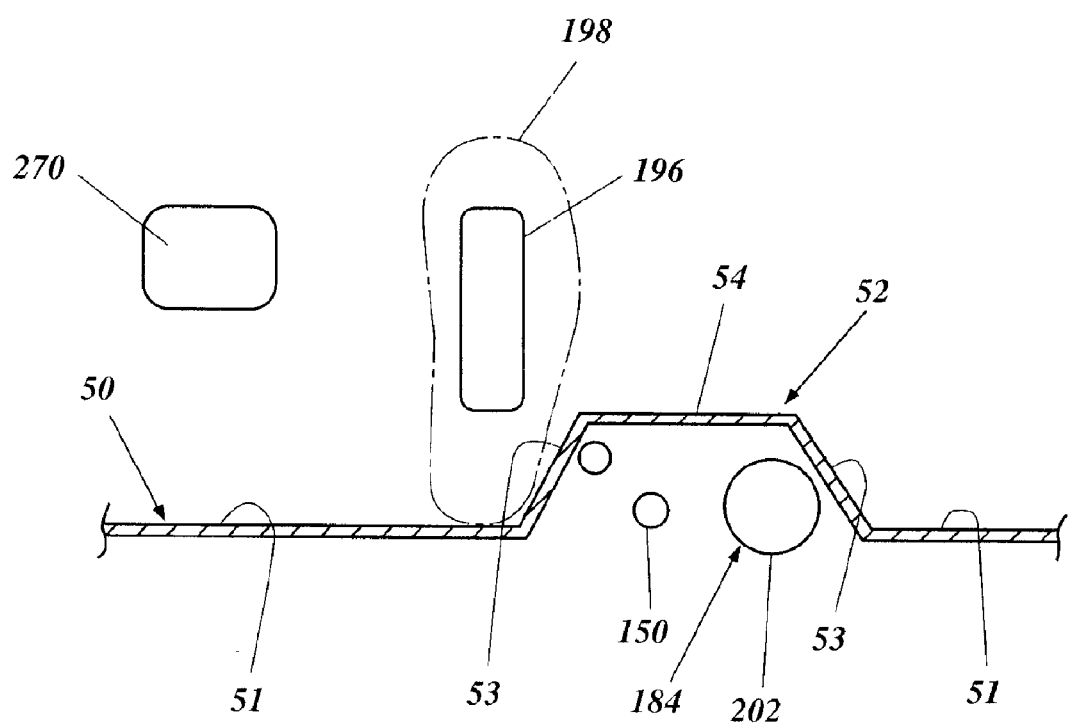
FIG. 4 is a partial cross-sectional of the off-road vehicle taken along the line 4-4 of FIG. 2.

With reference to FIGS. 1, 2 and 4, the off-road vehicle 30 preferably has an open tubular-type frame 32. The illustrated frame 32 comprises a main frame section 34, a front frame section 36, a rear frame section 38 and a compartment frame section (or pillar frame section) 40.

The main frame section 34 includes a pair of side frame units 42 spaced apart side by side with each other. Each side frame unit 42 comprises a front tubular member 42a (FIG. 2) and a rear tubular member 42b (FIG. 2). Each tubular member 42a, 42b preferably is rectangularly formed in section, but other configurations can also be used. In one variation, the front and rear members 42a, 42b can have a circular shape in section. Moreover, the members 42a, 42b can have an incomplete tubular shape such as, for example, a U-shape. A rear end of the front tubular member 42a is bent outwardly and is coupled with a mid portion of the rear tubular member 42b. A forward end of the rear tubular member 42b is bent inwardly and is coupled with a mid portion of the front tubular member 42a Thus, in the illustrated arrangement, both of the front and rear tubular members 42a, 42b are nested together. The side frame units 42 preferably are connected together by front, center and rear cross members 44 (FIG. 2) that transversely extend between the tubular members 42a, 42b.

The front frame section 36 extends generally upward from a front portion of the main frame section 34. The rear frame section 38 also extends generally upward from a rear portion of the main frame section 34. The rear frame section 38 preferably includes a pair of rear frame members 46 (FIG. 2). Several struts connect the rear frame members 46 to the side members 42 of the main frame section 34 and support the rear frame members 46 above the side members 42.

The compartment frame section 40 is disposed generally between the front and rear frame sections 36, 38 in a side view as shown in FIG. 1. The compartment frame section 40 includes a pair of compartment members (or pillar members) 48 extending generally upward and higher than the front and rear frame sections 36, 38. The compartment members 48 are spaced apart from each other on both sides of the off-road vehicle 30 to be placed more outward than the main frame section 34 in the illustrated embodiment.

A floorboard or floor panel 50 extends in an area generally defined by the compartment members 48 in a top plan view as shown in FIG. 2 and is affixed at least to the main frame 34. The floorboard 50 defines a passenger compartment together with the compartment frame section 40. As best shown in FIG. 4, the illustrated floorboard 50 generally is a flat panel with a portion that projects upward. That is, the floorboard 50 comprises a horizontal section 51 defining a generally flat area and a projection 52 defining a tunnel extending along a longitudinal center plane LC (FIG. 2) of the frame 32 that extends vertically and fore to aft. The horizontal section 51 can support feet of a driver and a passenger and also can be used as a step when the driver or the passenger enters or leaves the passenger area of the off-road vehicle 30. The illustrated projection 52 is trapezoidally configured in section and thus has slanted side surfaces 53 and a top surface 54. Other configurations can also be used.

The main, front, rear and compartment frame sections 34, 36, 38, 40 preferably are welded to each other. The illustrated structure and arrangement of the frame 32, and the combination of the frame 32 and the floorboard 50 are merely one example. Various structures, arrangements and combinations other than those are practicable. For instance, the respective frame sections 34, 36, 38, 40 can be provided with struts or reinforcement members that are not described above.

With reference to FIGS. 1 and 2, the off-road vehicle 30 preferably has a pair of front wheels 56 and a pair of rear wheels 58 those of which together support the frame 32. Each wheel 56, 58 preferably has a balloon tire (i.e., a tube-less tire) to advantageously proceed over rough roads and in mud and water. Preferably, the balloon tire is relatively wide and air pressure of the tire is relatively high. In one arrangement, the selected balloon tires are sized as follows: 25×8-12 at the front end and 25×10-12 at the rear end.

The front and rear wheels 56, 58 preferably are coupled with the frame 32 through front suspension mechanisms 60 and rear suspension mechanisms 62, respectively. Each front suspension mechanism 60 swingably (up and down) and independently suspends the associated front wheel 56. Each rear suspension mechanism 62 also swingably (up and down) and independently suspends the associated rear wheel 58. Thus, the illustrated off-road vehicle 30 preferably features four wheel independent suspension.

With reference to FIGS. 1-3, 6 and 7, the off-road vehicle 30 preferably has a seat unit 66. The illustrated seat unit 66 comprises a pair of seats 68 on which the driver and the passenger can sit. The seats 68 preferably are disposed side by side. The rear frame section 38, at least in part, forms a pair of seat pedestals (not shown). Each seat 68 and each seat pedestal together form a seat assembly. The illustrated off-road vehicle 30 thus has two seat assemblies. The seat assemblies are spaced apart from each other to form a space 70 (FIG. 2) therebetween. Through this description, the term "seat unit" may include the space 70 in the broad sense.

A preferable construction or structure of an off-road vehicle similar to the off-road vehicle 30 is disclosed in, for example, co-pending U.S. application Ser. No. 10/791,111 filed on Mar. 2, 2004, titled "ENGINE ARRANGEMENT FOR OFF-ROAD VEHICLE," co-pending U.S. application Ser. No. 10/791,353 filed on Mar. 2, 2004, titled "DRIVE SYSTEM FOR OFF-ROAD VEHICLE," co-pending U.S. application Ser. No. 10/790,932 filed on Mar. 2, 2004, titled "AIR INTAKE SYSTEM FOR OFF-ROAD VEHICLE," co-pending U.S. application Ser. No. 10/792,463 filed on Mar. 2, 2004, titled "FLOOR ARRANGEMENT FOR OFF-ROAD VEHICLE," co-pending U.S. application Ser. No. 10/794,132 filed on Mar. 5, 2004, titled "STEERING SYSTEM FOR OFF-ROAD VEHICLE," co-pending U.S. application Ser. No. 10/791,164 filed on Mar. 2, 2004, titled "OFF-ROAD VEHICLE WITH AIR INTAKE SYSTEM," co-pending U.S. application Ser. No. 10/796,962 filed on Mar. 9, 2004, titled "OFF-ROAD VEHICLE WITH WHEEL SUSPENSION," and co-pending U.S. application Ser. No. 10/796,609 filed on Mar. 9, 2004, titled "FRAME ARRANGEMENT FOR OFF-ROAD VEHICLE," the entire contents of which are hereby expressly incorporated by reference.

In this description, the terms "front" and "forward" mean the direction in which the driver or passenger looks straight when seated on the seats 68. Also, the terms "rear," "rearward" and "backward" mean the direction opposite to the front direction.

Each seat 68 preferably comprises a seat cushion 72 and a seat back 74. The seat cushion 72 extends generally horizontally over the seat pedestal and is detachably or removably affixed to the seat pedestal. The seat back 74 extends generally vertically and upward from a rear portion of the seat cushion 72. In the illustrated arrangement, the seat cushion 72 and the seat back 74 are formed unitarily. In one variation, the seat cushion 72 and the seat back 74 can be separately formed and assembled together.

Figure 3:
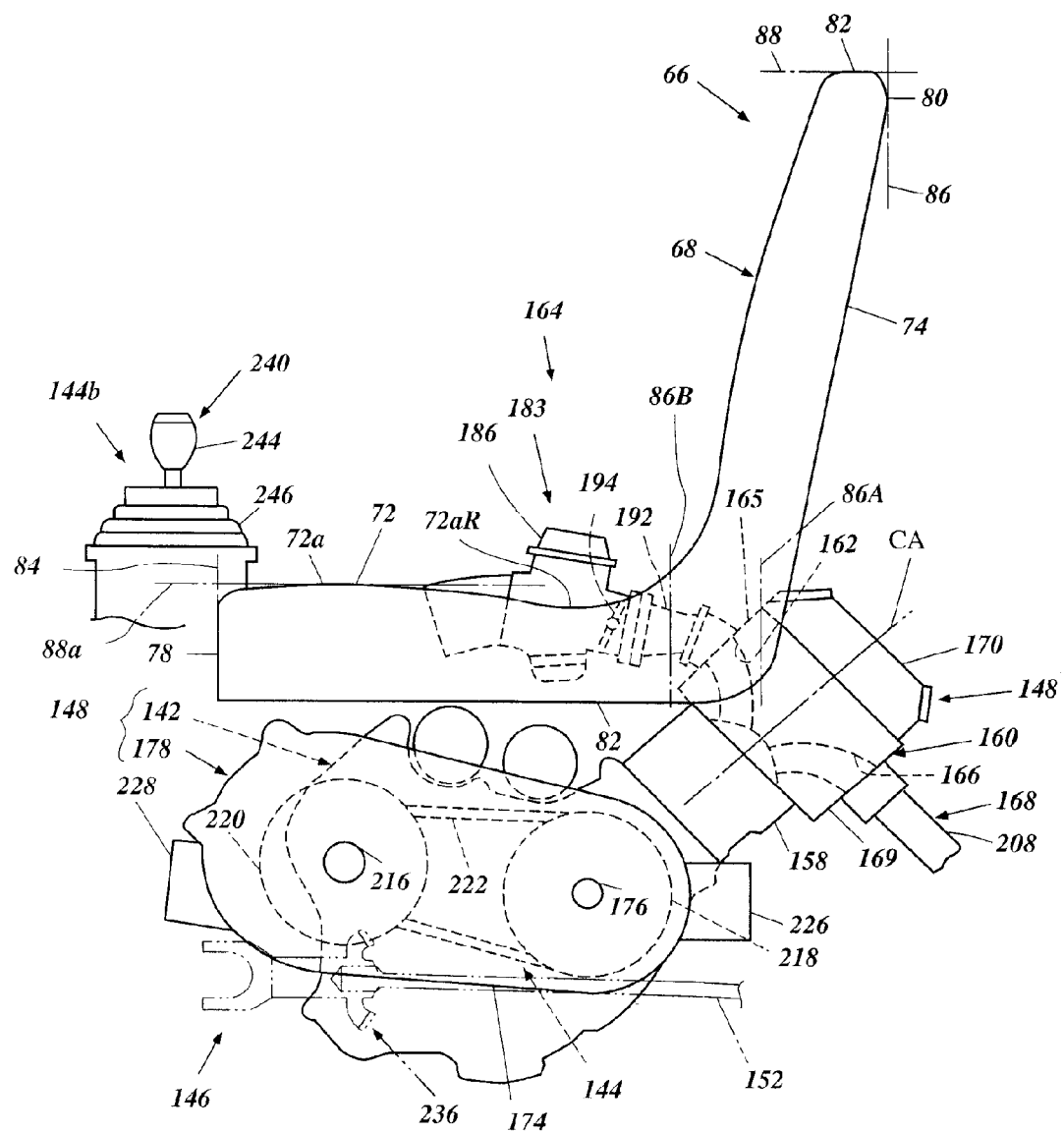
FIG. 3 is a schematic side elevational view of the off-road vehicle showing at least an engine unit, a seat and a portion of an air intake system.

With reference to FIG. 3, the illustrated seat unit 66 has a forward end 78, a rear end 80 and a top end 82. In this arrangement, the forward end 78 of the seat unit 66 is defined by forward ends of the seat cushions 72. If, however, the seat pedestals extend forward of than the seat cushions 72, forward ends of the seat pedestals can define the forward end of the seat unit 66. An imaginary forward, generally vertical plane 84 can be defined through the forward end of the seat unit 68.

The rear end 80 and the top end 82 preferably are defined by rear ends of the seat backs 72 and top ends of the seat backs 74, respectively. An imaginary rearward, generally vertical plane 86 can be defined through the rear ends of the seat backs 74. Also, an imaginary, generally horizontal plane 88 can be defined through the top ends 82 of the seat backs. The seat 68, however, can be shaped in various configurations. The seat back 74 may be omitted under some circumstances. If the seat back 74 is omitted, the imaginary rear, generally vertical plane 86 can be defined more forwardly as indicated by the reference numeral 86A. Furthermore, the rear, generally vertical plane 86 may be defined more forwardly as indicated by the reference numeral 86B if the thickness of the seat back 74 is reduced. Also, the generally horizontal plane 88 may be shifted downward to a top surface 72a of each of the seat cushions 72 as indicated by the reference numeral 88A.

In the illustrated embodiment, the top surface 72a of each seat cushion 72 undulates and has a recessed portion 72aR that is positioned lower than the horizontal plane 88A just in front of the seat back 74. The driver or the passenger sits in the recessed portion 72aR of the respective seat 68.

Thus, the forward, rear and top ends 78, 86, 82, the imaginary forward and rear generally vertical planes 84, 86 and the imaginary generally horizontal plane 88 are normally determined depending on a configuration of the seat assembly, which includes the seat 68 and the seat pedestal in the illustrated arrangement. More practically, the rear end 86 should be substantially on the imaginary, generally vertical forward plane 86A or the imaginary, generally vertical rear plane 86B. Also, the top end 82 should be substantially the upper-most end of the seat cushions 72 and should be on the imaginary, generally horizontal plane 88A. Because the seats 68 are positioned on the seat pedestals which have a certain height, a relatively large space is formed lower than the imaginary, generally horizontal plane 88A.

The seat unit 66 can have other number of seats such as, for example, three seats in some alternative arrangements. The seats 68 can be made of any soft materials such as, for example, but without limitation, cloth, rubber, sponge or styrene foam. Further, the seats 68 can be made of hard materials rather than the soft materials. For example, metal, hard plastic or wood can be used.

Figure 6:
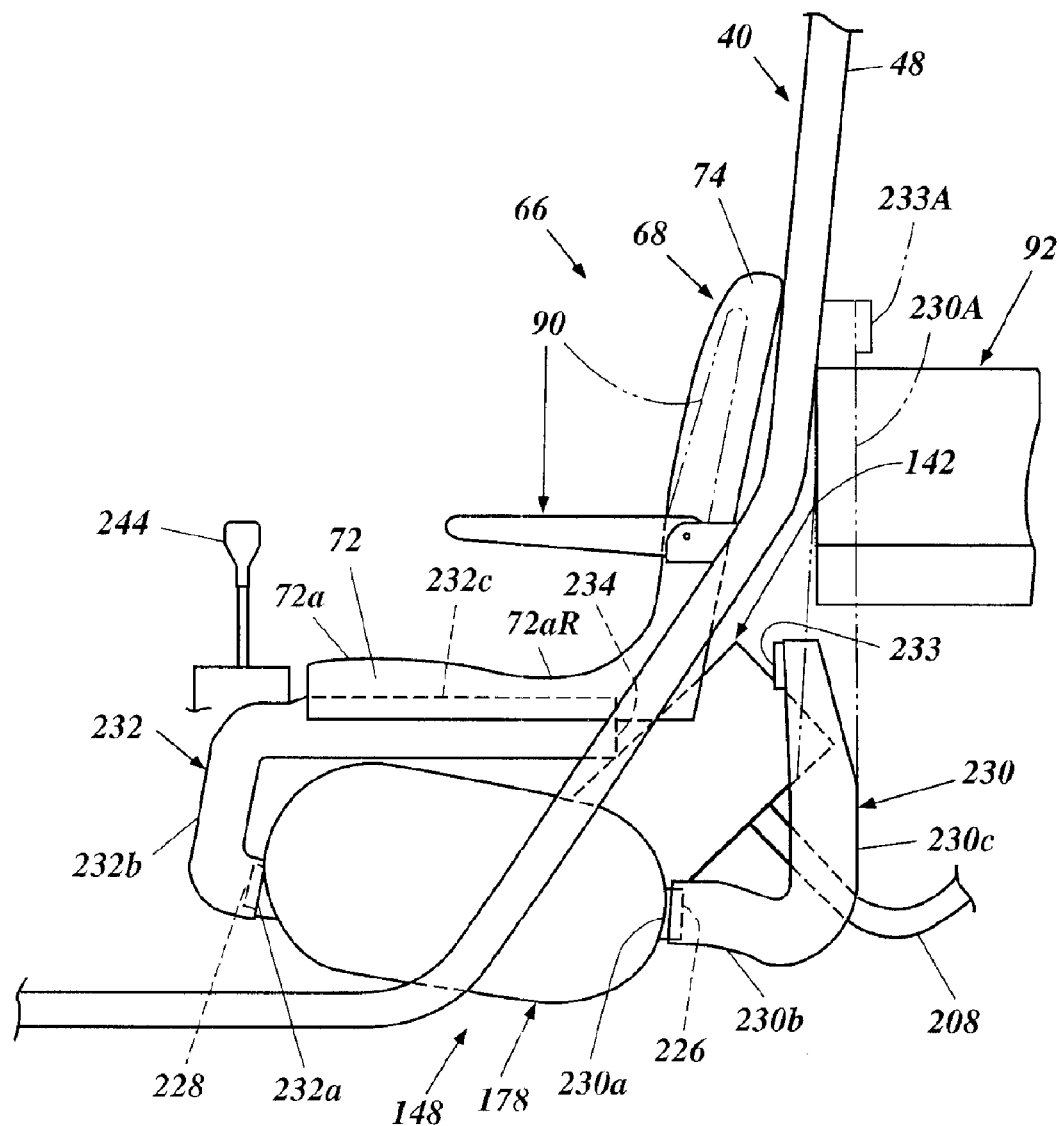
FIG. 6 is a schematic side elevational view of the engine unit and the seat, as well as a portion of a framework of the off-road vehicle that extends next to the engine unit and the seat, and also illustrates a modified air inlet duct shown in phantom.
Figure 7:
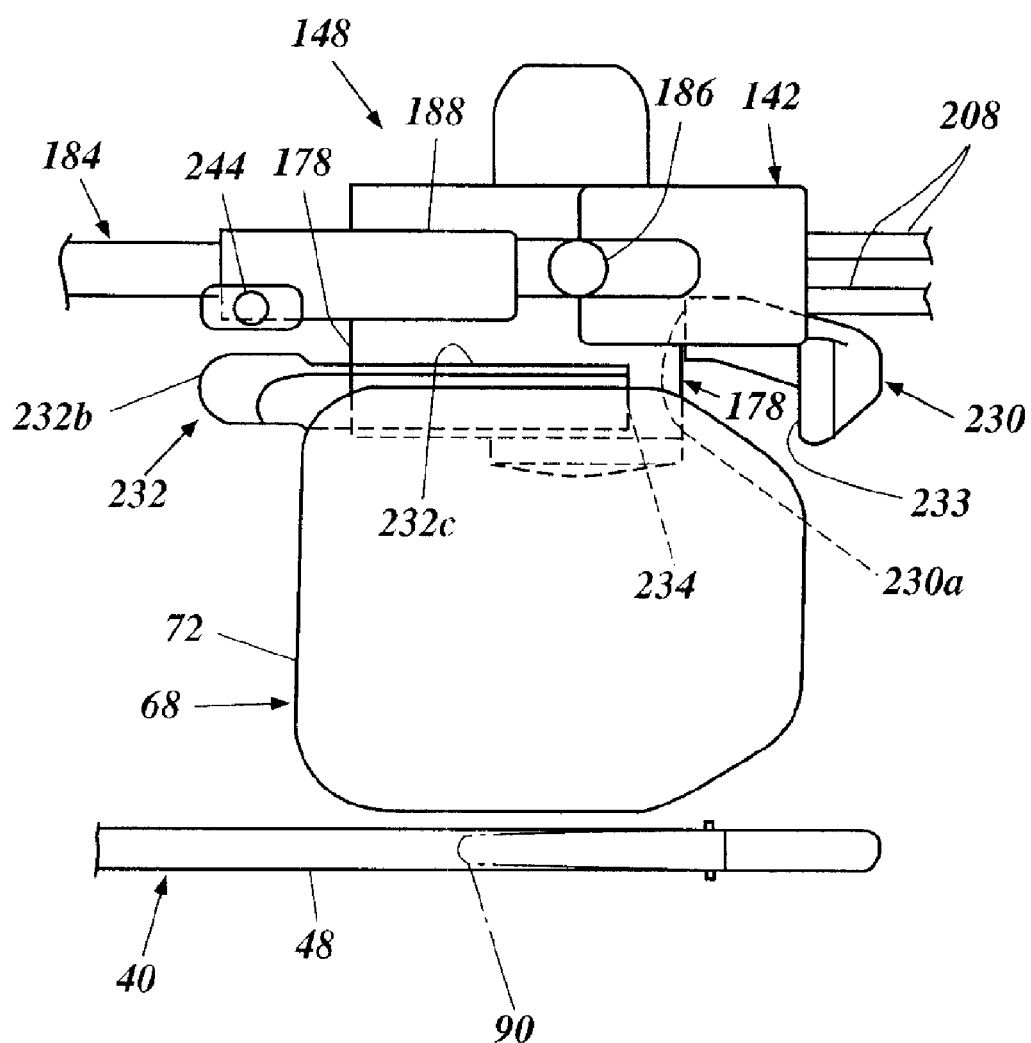
FIG. 7 is a schematic top plan view of the engine unit, the seat and the portion of the off-road vehicle framework shown in FIG. 6.

With reference to FIGS. 6 and 7, the respective compartment members 48 on both sides preferably have an arm rest 90, although only the arm rest 90 on the left-hand side is illustrated. Each arm rest 90 preferably is affixed to a portion of each compartment member 48 for pivotal movement about a pivot axis that extends transversely relative to the associated compartment member 48. The arm rest 90 thus can move between a fully extended position (illustrated by solid lines in the figures) and a fully retracted position (illustrated by phantom lines in the figures). The arm rest 90 can be held generally horizontally when the arm rest 90 lies in the fully extended position. On the other hand, the arm rest 90 can generally extend parallel to the compartment member 48 when the arm rest 90 lies in the fully retracted position. The driver or the passenger (or both) can place one of his or her arm(s) on the arm rest while sitting on the seat(s) 68.

Additionally, conventional seat belts (not shown) such as, for example, three-point retaining type seat belts can hold the driver and e passenger in an appropriate position on the seats 68. Metal fittings that fix the seat belts preferably are positioned in the compartment area defined by the compartment frame 40 such that the fittings cannot be caught by branches or twigs of trees while the off-road vehicle 30 proceeds in a forest or woods. In other words, the metal fittings preferably are not exposed out of the compartment area.

With reference to FIGS. 1 and 2, the off-road vehicle 30 preferably has a carrier or cargo box 92 behind the seat unit 66. The illustrated carrier 92 extends over a rear portion of the rear frame section 38 and is suitably affixed at least to the rear frame members 46. In one arrangement, the carrier 92 can be tipped rearward to allow its contents to be dumped. The carrier 92 preferably is formed generally in the shape of a rectangular parallelepiped and has a bottom, a front, a rear, and a pair of lateral sides. That is, the carrier 92 is generally configured as an open-topped box.

The bottom of the carrier 92 preferably comprises steps 96 on both sides such that side portions 98 of the bottom are positioned higher than a center portion 100 of the bottom. The steps 96 advantageously reduce the likelihood that the rear wheels 58 will contact the carrier 92 when the rear wheels 58 are in an uppermost position of the suspension travel. It should be noted that the described movement of the rear wheels 58 is the relative movement thereof in relation to the carrier 92. The center bottom portion 100 thus increases the capacity of the carrier 92. Each 96 preferably extends fore to aft as shown in FIG. 2. Longitudinally shortened steps (similar to wheel wells) also can be used.

The center bottom portion 100 helps lower the center of gravity of the carrier 92. The illustrated off-road vehicle 30 thus features enhanced stability. The steps 96 also reduce lateral movement of loads. Additionally, the manufacture of the carrier 92 is simple and cost effective because the steps 96 only extend fore to aft. The steps 96 also can increase the stiffness of the carrier 92.

With reference to FIGS. 1 and 2, the off-road vehicle 30 comprises a steering system 104. The steering system 104 in the illustrated embodiment includes a steering wheel 106 and a steering shaft unit 110. The steering shaft unit 110 is disposed on the frame 32 for steering movement in front of the seat 68, which is located on the left-hand side of the illustrated off-road vehicle 30.

The illustrated steering shaft unit 10 comprises an upper steering shaft 116 and a lower steering shaft 118 both pivotally affixed to the frame 32. The upper shaft 116 extends generally upward and is inclined rearward toward the driver's area. The steering wheel 106 is affixed to the top end of the upper shaft 116. The driver thus can operate the steering wheel 106 while seated on the seat 68. The lower shaft 118 extends toward the other part of the steering system 104. The other part of the steering system 104 is structured to direct the front wheels 56 right or left relative to the longitudinal center plane LC of the frame 32 in response to the steering movement of the steering wheel 106. The other part of the steering system 104 preferably includes a pair of tie-rods (not shown) coupled to both the front wheels 56 and a rack-and-pinion assembly (not shown) connecting the lower shaft 118 with the tie-rods (not shown). The rack-and-pinion assembly in the illustrated embodiment is disposed on a front differential gear unit 119, which will be described below.

Preferably, an inclination angle of the upper steering shaft 116 is adjustable such that a position of the steering wheel 106 can be moved to fit various heights of drivers. For example, a ratchet-type tilt device can be used to adjust the inclination angle of the upper steering shaft 116.

With reference to FIGS. 1 and 2, a hood or bonnet 120 preferably covers a front portion of the frame 32. Preferably, the hood 120 comprises a top surface section, a front surface section and a pair of lateral side sections. Those sections can be unitarily formed with a piece of sheet metal and can be made in, for example, a press process. In one variation, separate pieces of the sections can be affixed together, for example, by welding. Other materials such as, for example, a plastic material can be used. Also, other conventional manners can be applied to produce the hood 120.

As thus constructed, the illustrated hood 120 covers the main frame section 34, the front frame section 36, the front wheels 56 and a major portion of the steering system 104. A dashboard 122 preferably depends from a rear end of the hood 120 and faces the passenger compartment. A meter unit 124 is disposed in a center area of the dashboard 122. The meter unit 124 preferably incorporates meters and/or gauges such as, for example, a speedometer, a fuel level meter and the like. Because of this meter unit arrangement, the driver can easily view the individual meters at a glance.

The top surface section of the hood 120 preferably inclines downward toward the front surface section of the hood 120. The hood front surface section extends downwardly (preferably in a generally vertical manner) from the top surface section of the hood. A front bumper 126 extends from the side frame units 42 forwardly and upwardly to protect the front surface section of the hood 120.

A radiator or heat exchanger 128 preferably is disposed between the front surface section of the hood 120 and the front frame section 36. The radiator 128 can be used to cool coolant (e.g., water) that is used in a cooling system. The radiator 128 can be affixed to the front frame section 36. The radiator 128 preferably has a fan 130 to cool heated coolant that flows through the radiator 128.

A battery 132 is preferably disposed under the hood 120 and generally behind the radiator 128. The battery 132 can be placed on a stay or bracket extending from the front frame section 36 and can be affixed to the stay or bracket in a proper manner. The illustrated buttery 132 is positioned above the front differential gear unit 119. At least a top surface of the battery 132 is positioned at almost the same elevation as the seat cushions 72 in the illustrated arrangement.

The above-described position of the battery 132, which has significant weight, improves the weight balance of the off-road vehicle 30. That is, the center of the gravity of the off-road vehicle 30 can be shifted forward by spacing the battery 132 well apart from an engine unit of the off-road vehicle, which preferably is disposed between the seats 68 as described shortly. The battery 132 in this location also can be cooled by the fan 130 of the radiator 128. Moreover, because at least the top of the battery 132 is positioned at almost the same elevation as the seat cushions 72, the battery 132 is less likely to be submerged in water even when the wheels 56, 58 are submerged. Further, no space is necessary for the battery 132 under or around the seats 68. Thus, the space under or around the seats 68 can be used for placing other large components such as, for example, a fuel tank and a luggage box, as well as can be used for other for other purposes.

With reference to FIGS. 1-5, the off-road vehicle 30 has a prime mover that powers the off-road vehicle 30 and particularly the front and rear wheels 56, 58. The prime mover preferably is an internal combustion engine 142. Alternatively, an electric motor can replace the engine 142. Engine power is transferred to the front and rear wheels 56, 58 through a suitable transmission 144 and a suitable drive system 146. In the illustrated arrangement, the engine 142 and the transmission 144 are coupled together to form the engine unit, which now is indicated by the reference numeral 148. The engine 142 includes foregoing cooling system mentioned above.

The illustrated transmission 144 advantageously includes an endless transmission mechanism 144a and a switchover mechanism 144b. The illustrated drive system 146 comprises a forward driveshaft 150 extending forward from the engine unit 148, a rear driveshaft 152 extending rearward from the engine unit 148. A front differential gear unit 119 is coupled with the front axles (not shown) of the front wheels 56, and a rear differential gear unit 154 is coupled with the rear axles (not shown) of the rear wheels 58. In some arrangements, a single axle can replace the half axles.

The forward driveshaft 150 preferably extends through the tunnel defined by the projection 52 of the floorboard 50. In other words, the forward driveshaft 150 is positioned under the top surface 54 of the projection 52 of the floorboard 50 and is positioned higher than the horizontal section 51 of the floorboard 50. In this position, the forward driveshaft 150 is less likely to be hit by rocks, wooden blocks or the like.

The engine unit 148 preferably is positioned generally in the space 70 defined between the seat assemblies. The illustrated engine 142 operates on a four-stroke combustion principle; however, other operating principles can be used (e.g., 2 stroke and rotary). The engine 142 preferably has a single cylinder block 158 that extends generally upward and rearward from a lower section of the engine unit 148. That is, the cylinder block 158 has a cylinder axis CA that inclines relative to vertical at a certain angle. The illustrated cylinder axis CA inclines from vertical at approximately 45 degrees.

In the illustrated arrangement, the engine 142 is an internal combustion engine. As such, the cylinder block 158 preferably defines a cylinder bore (not shown) therein. A piston (not shown) is reciprocally disposed within the cylinder bore (not shown). A cylinder head 160 preferably closes an upper end of the cylinder bore to define, together with the cylinder bore and the piston, a combustion chamber 163.

The cylinder head 160 also defines a pair of intake ports 162 and a pair of exhaust ports 166 that communicate with the combustion chamber 163. An intake valve can be provided at each intake port 162 to selectively open the combustion chamber 163 to an air intake system 164. In the illustrated arrangement, the air intake system 164 is coupled with the intake ports 162 at a front surface 165 of the cylinder head 160. The front surface 165 of the cylinder head 160 preferably is disposed substantially within the space 70 and preferably faces generally forward and upward. With reference to FIG. 2, the front surface 165 desirably is disposed generally between the seats 68.

The air intake system 164 introduces air into the combustion chamber 163 through the intake ports 162 when the intake valves (not shown) open the passage into the combustion chamber 163. An exhaust valve (not shown) also is provided at each exhaust port 166 to selectively open the combustion chamber 163 to an exhaust system 168. In the illustrated arrangement, the exhaust system 168 is coupled with the exhaust ports 166 at a rear surface 169 of the cylinder head 160. The rear surface 169 of the cylinder head 160 is positioned substantially opposite to the front surface 165 and generally faces rearward and downward. The exhaust system 168 routes exhaust gases from the combustion chamber 163 to an outside location.

A cylinder head cover 170 is attached to the cylinder head 160 to enclose one or more camshafts (not shown). The camshafts (not shown) preferably are journaled on the cylinder head 160. The camshafts (not shown) actuate the intake and exhaust valves at speeds that are generally in proportion to the engine speed. Other suitable methods of actuating the valves also can be used.

An upper section of the illustrated engine unit 148 includes the cylinder block 158, the cylinder head 160 and the cylinder head cover 170. The upper section at least in part extends rearward beyond the imaginary rear, generally vertical plane 86 (and 86A or 86B).

A lower section of the engine unit 148, which is the balance of the engine unit 148, comprises a crankcase 174, which closes a lower end of the cylinder bore (not shown). A crankshaft 176 preferably is journaled within the crankcase 174 and is coupled with the piston (not shown) in any suitable manner. In the illustrated arrangement, the crankshaft 176 extends generally transverse to a direction of travel of the vehicle but other orientations also can be used. The reciprocal movement of the piston results in rotation of the crankshaft 176. The crankshaft 176 preferably drives the camshafts via a camshaft drive mechanism.

The crankcase 174 also houses an input shaft for a shiftable portion of the transmission 144. The input shaft is positioned forward of the crankshaft 176. The lower section of the engine unit 148 also comprises a V-belt housing 178, which is positioned next to the crankcase 174 in the illustrated arrangement. Moreover, in the illustrated arrangement, the V-belt housing 178 is defined on the left-hand side of the crankcase 174. The V-belt housing 178 houses the V-belt transmission mechanism (e.g., continuously variable transmission). Thus, in the illustrated embodiment, the lower section of the engine unit 148 (which comprises at least the crankcase 174 and the V-belt housing 178) houses the transmission 144. The transmission 144 will be described in greater detail below.

With reference to FIGS. 1-4, the illustrated air intake system 164 extends forward to a location under the hood 120 from the intake ports 162 of the engine 142. The intake system 164 preferably comprises an air cleaner unit 182 and an air delivery conduit 183 which is formed with the remainder part of the intake system 164 other than the air cleaner unit 182. The air delivery conduit 183 preferably includes an air intake duct 184 and a throttle body or carburetor 186. The illustrated air intake duct 184 includes an accumulator or plenum chamber 188.

With reference to FIG. 3, the throttle body 186 in the illustrated embodiment is connected to the intake ports 162 through an air intake conduit 192. The throttle body 186 comprises a throttle valve 194 that regulates a rate of airflow amount delivered to the combustion chamber 163. The throttle valve 194 preferably is a butterfly valve and generally is journaled for pivotal movement. The level of airflow depends on an angular position of the throttle valve 194—when the throttle valve is closed or substantially closed, minimal air flow results, while when the throttle valve is opened or substantially opened, maximum air flow results.

An accelerator pedal or control member 196 (FIG. 4) preferably is disposed at a front end of the floorboard 50 for pivotal movement to control the position of the throttle valve 194. A throttle cable connects the accelerator pedal 196 to the throttle valve 194. The driver thus can control the throttle valve 194 by adjusting an angular position of the accelerator pedal 196 with his or her own foot 198. Normally, the greater the throttle valve 194 opens, the higher the rate of airflow amount and the higher the engine speed. Other suitable mechanisms and electronic connections also can be used to transmit operator demand to the throttle valve or engine.

The throttle body (e.g., the carburetor) 186, which functions as a charge former, preferably also has a fuel measurement mechanism that measures an amount of fuel mixed with the air in accordance with the rate of airflow. Because of this fuel measurement mechanism, air/fuel ration supplied to the engine can be controlled and/or optimized depending upon engine operating conditions. The fuel is delivered to the throttle body 186 from a fuel tank (not shown) that can be suitably mounted and suitably position on the frame 32.

Other charge formers such as, for example, a fuel injection system can be used. The fuel injection system has a fuel injector that is configured to spray fuel directly into the combustion chamber 163 or into a portion of the air intake system downstream of the throttle valve. An engine control unit (ECU) can control the amount of furl injected, for example, in accordance with the airflow rate.

With reference to FIGS. 1 and 2, the accumulator 188 can be coupled with an inlet of the throttle body 186. The accumulator 188 generally forms a portion of the intake duct 184 but provides a larger volume, which is due to a larger cross-sectional flow area, than the rest portion of the intake duct 184 to temporarily accumulate air delivered to the throttle body 186. Such a construction allows air to accumulate before delivery to the throttle body 182. The accumulator 188 is useful to expedite delivering of the air to the combustion chamber when the demand on engine load rapidly increases. As best shown in FIG. 1, the accumulator 188 generally has an arcuate configuration. Such a construction advantageously smoothens the delivery of air to the engine. Furthermore, because the accumulator 184 has a relatively large volume and is disposed next to the throttle body 182, the intake efficiency of the induction system is greatly improved. That is, sufficient air can be quickly supplied to the engine even when the engine is being operated at a relatively high engine speed.

In the illustrated arrangement, the air intake conduit 192, the throttle body 182 and the accumulator 184 together extend forwardly of the engine within a region defined between the seats 68. Upper portions of the throttle body 182 and the accumulator 184 preferably are positioned slightly higher than the top ends 82A of the seat cushions 72. A forward-most portion of the accumulator 184 turns downward at or just forward of the forward end of the seat assemblies.

Because of this arrangement, the throttle body 182 and at least a portion of the accumulator 184 are interposed between the seat assemblies and are positioned within, or just adjacent to, the space 70. Thus, the throttle body 182 and the accumulator 184 are positioned within a protective region of the vehicle that is located higher than a lowermost surface of the frame assembly or the floorboard 50. Such positioning reduces the likelihood that dirt and other road debris that may be kicked up underneath the vehicle will damage the throttle body 182 or the accumulator 184. Such placement also facilitates servicing of these components and protects these components from water damage while fording a stream, a mud bog or the like.

The illustrated accumulator 184, which is positioned within the most downstream portion of the illustrated intake duct 186, ends above a lowermost surface defined by the rear frame section 38. The balance of the air intake duct 186, which has a smaller volume or cross-sectional area than the accumulator 184, preferably comprises a downstream section 200, a middle section 202 and an upstream section 204, which are provide a contiguous air flow path in the illustrated embodiment. The downstream section 200 extends downwardly from the accumulator 184 to a lowermost portion of the rear frame section 38. The middle section 202 extends forwardly in a generally horizontal direction from a lower end of the downstream section 200.

With reference to FIG. 4, in the illustrated arrangement, the middle section 202 extends through a tunnel defined by the projection 52 of the floorboard 50. Because of this arrangement, the middle section 202 advantageously is positioned higher than the horizontal section 51 of the floorboard 50, which greatly reduces the likelihood of damage from rocks, sticks, road debris or the like. Furthermore, the driver and/or the passenger are able to maintain a good riding body position because the horizontal section 51 is positioned generally vertically lower than the middle section 202. Moreover, the illustrated arrangement contributes to a lower center of gravity for the off-road vehicle 30 because the height of the seats 68 does not need to be increased to accommodate the middle section 202 or another portion of the air induction system.

The middle section 202 preferably ends at a location close to the front frame section 36. The upstream section 204 extends generally vertically upward from the middle section 202. In addition, the upstream section 204 preferably is positioned within a space defined below the hood 134. To increase the protection from ingestion of water, the forward-most portion of the upstream section 204 extends forward and slightly downward along a lower surface of the hood 134. Because the hood 120 inclines downwardly and forwardly, an upstream end portion 204a of the upstream section 204, which is located next to the air cleaner unit 182, turns upwardly and is positioned higher than at least an air outlet port of the air cleaner unit 182 which opens at a rear end 205 of the air cleaner unit 182.

The air cleaner unit 188 preferably is attached to the upstream end of the intake duct 186 and extends generally along the lower surface of the hood 134. The illustrated air cleaner unit 188 has a relatively large volume and has a cleaner element therein. The air cleaner unit 188 also has an air inlet port that opens at a front end 206 of the cleaner unit 188. The inlet port preferably is positioned at least higher than the respective top ends 56a, 58a of the wheels 56, 58 and more preferably higher than the top surfaces 72a of the seat cushions 72. Because of this arrangement, water is not likely to enter the air cleaner unit 182 even when the off-road vehicle 30 travels through water streams, mountain torrents or muddy pools. Ambient air is drawn into the air cleaner unit 188 through the air inlet port and passes through the filtration element such that foreign substances such as, for example, dust, mud or water can be substantially removed from the air that is being introduced into the engine.

The air, which has been cleaned in the cleaner unit 188, flows to the accumulator 188 through the rest part of the intake duct 184. The airflow amount is regulated by the throttle valve 194 in the throttle body 186. Simultaneously, an amount of fuel is measured by the fuel amount measurement mechanism in the throttle body 186 in response to the air amount. An air/fuel charge that has a proper air/fuel ratio is formed and is delivered to the combustion chamber 163 when the intake valves open the intake ports 162. The air/fuel charge is ignited by an ignition system (not shown) and burns within the combustion chamber 163. The burning of the charge causes expansion of the gases and increased pressure that results in movement of the piston 159. The crankshaft 176 is rotated within the crankcase 174 by the movement of the piston 159.

Figure 10:
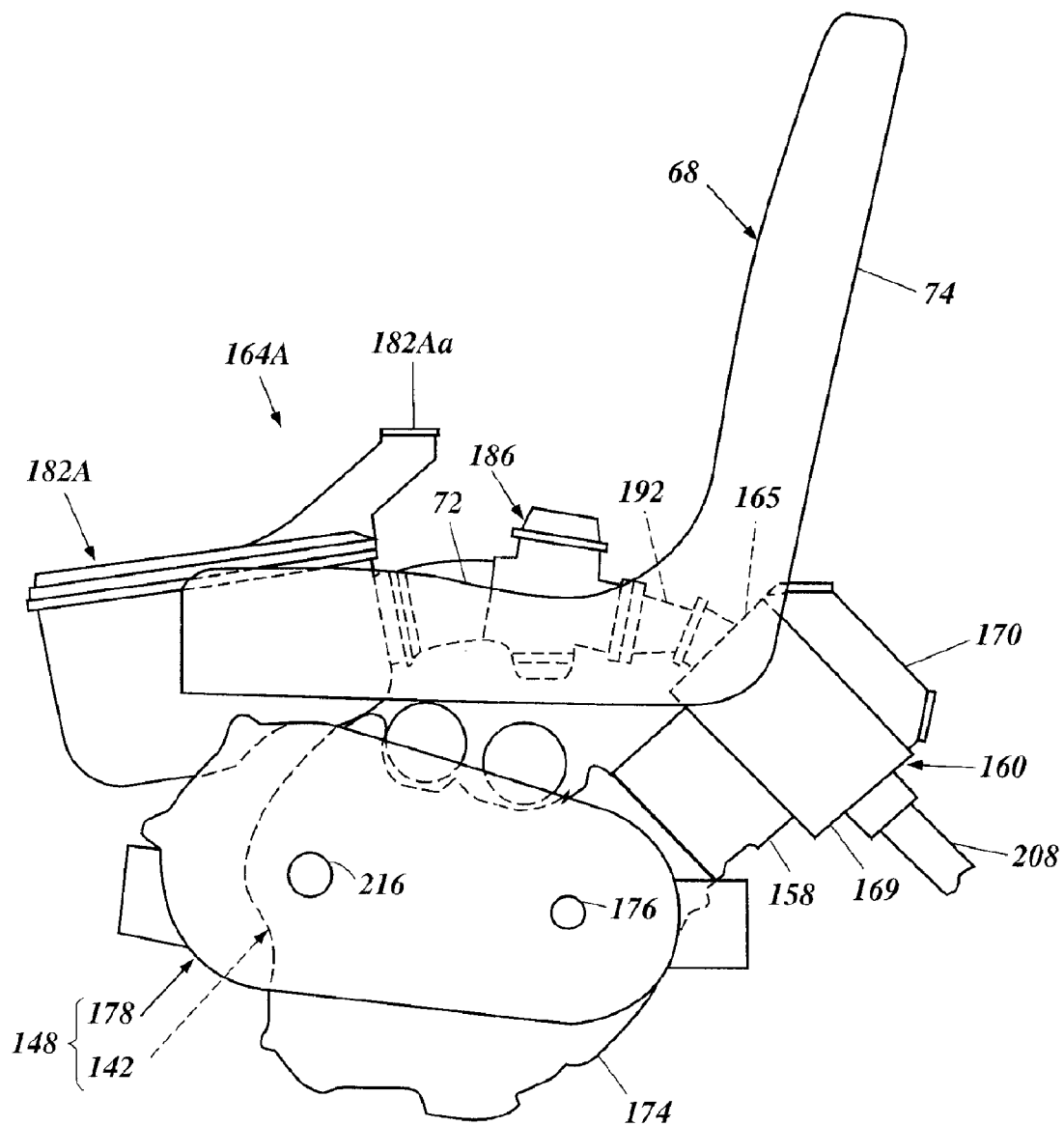
FIG. 10 is a schematic side elevational view of the engine unit, the seat and a modified air intake system.

With reference to FIG. 10, a modified air intake system 164A can have an air cleaner unit 182A that is directly coupled with the throttle body 186. The devices, units, components, members and portions thereof that have been already described above are assigned with the same reference numerals and will not be repeatedly described. Also, similar devices, units, components, members and portions thereof are assigned with the same reference numerals with the letter "A" and will not be described in detail.

At least a portion of the air cleaner unit 182A is positioned in the space 70 defined by the seats 68. The air cleaner unit 182A preferably has an air inlet port 182Aa that extends upward from a rear top surface of the unit 182A. The illustrated inlet port 182Aa preferably is positioned higher than the top surfaces of the respective seat cushions 72 and more preferably higher than a top surface of the throttle body 186.

With reference back to the embodiment illustrated in FIGS. 1-3, the burnt charge, i.e., exhaust gases are discharged through the exhaust system 168. The illustrated exhaust system 168 preferably comprises a pair of exhaust conduits 208 and a muffler 210. The exhaust conduits 208 are coupled with the respective exhaust ports 166 and extend generally rearward. The exhaust conduits 208 extend generally parallel to each other. Preferably the exhaust conduits 208 have a wavy shape that serpentines up and down, as shown in FIGS. 1 and 2. Rearward ends of the exhaust conduits 208 preferably extend beyond a rear end of the rear frame section 38. The muffler 210 is coupled with the rear ends of the exhaust conduits 208.

The muffler 210 preferably has a cylindrical shape. A center axis of the muffler 210 preferably extends in a generally transverse direction relative to the longitudinal center plane LC of the frame 32. The muffler 210 has a relatively large volume to reduce exhaust energy and noise. An outlet port 212 can be formed at a side surface, which is on a left-hand side in the illustrated embodiment. Other arrangements also can be used. The exhaust gases flow through the exhaust conduits 208 and are discharged through the outlet port 212 of the muffler 210.

Because the exhaust system 168 in the illustrated embodiment has the relatively long exhaust conduits 208, the exhaust energy can be sufficiently reduced. On the other hand, however, the muffler 210, which has a relatively large weight, is disposed at the end of the frame 32.

Figure 11:
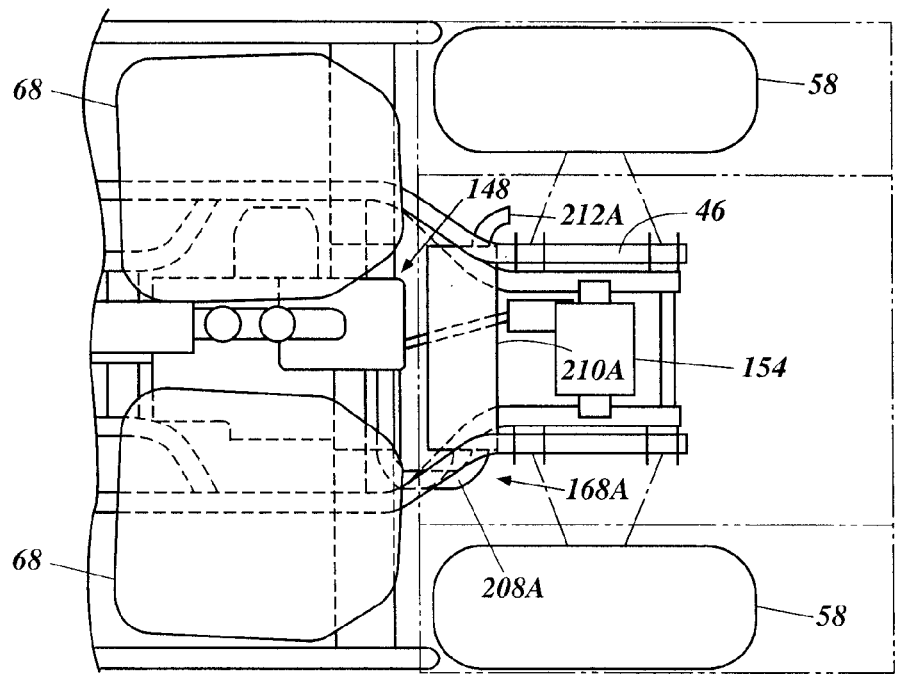
FIG. 11 is a top plan view of a rear portion of a modified off-road vehicle that includes another type of an exhaust system.
Figure 12:
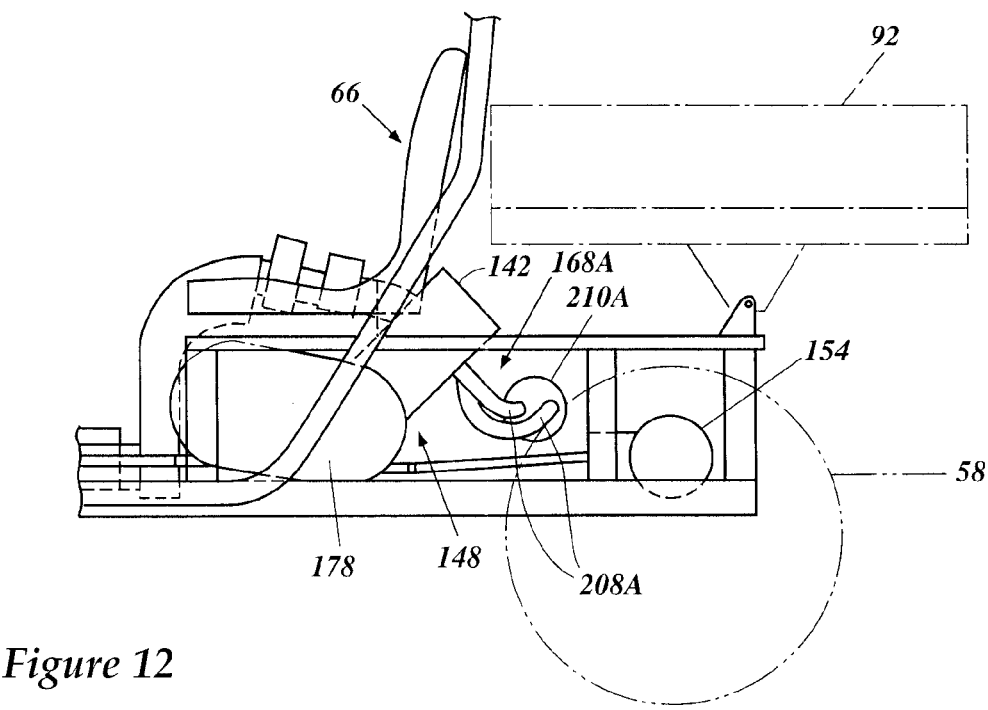
FIG. 12 is a side elevational view of the rear portion of the off-road vehicle illustrated FIG. 11.

With reference to FIGS. 11 and 12, a modified exhaust system 168A can include a muffler 210A that is disposed at a location closer to a midpoint of the frame 32. The devices, units, components, members and portions thereof that have been already described above are assigned with the same reference numerals and will not be repeatedly described. Also, similar devices, units, components, members and portions thereof are assigned with the same reference numerals with the letter "A" and will not be described in detail.

The muffler 210A in this modified embodiment preferably is disposed directly behind the engine unit 148 and is affixed to the rear frame members 46. An outlet port 212A of the muffler 210A is positioned on the right-hand side thereof.

Figure 5:
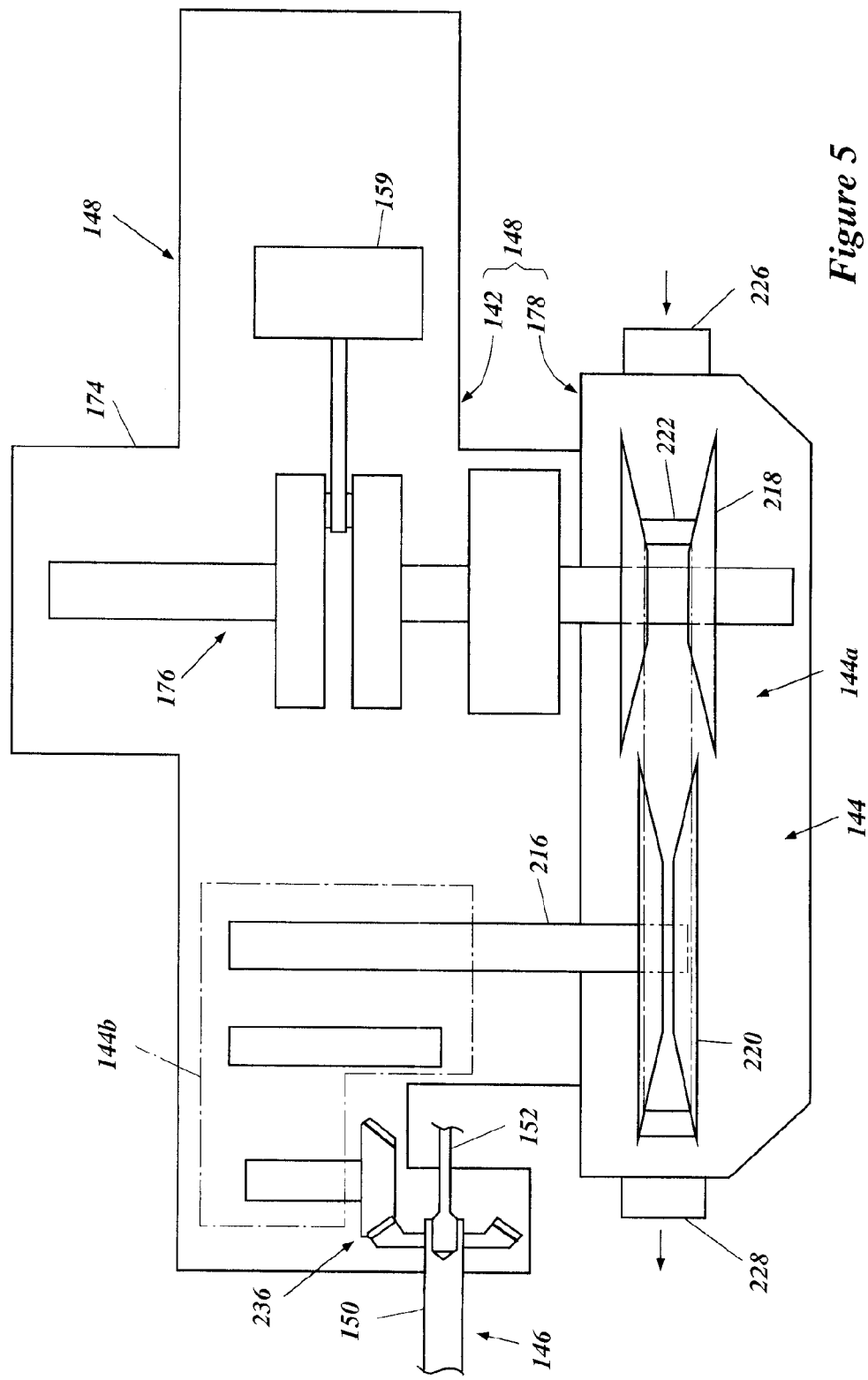
FIG. 5 is a schematic top plan view of the engine unit of FIG. 3.

With reference to FIGS. 1, 3 and 5, the change speed mechanism 144b and the V-belt transmission mechanism 144a together have a common output shaft 216. The output shaft 216 extends generally parallel to the crankshaft 176 at a location in front of the crankshaft 176. The output shaft 216 preferably extends through the crankcase 174 and the V-belt housing 178 and is journaled for rotation relative to these components. Because of this arrangement, the output shaft 216 is positioned at a location generally between the front wheels 56 and the crankshaft 176. In other words, the crankshaft 176 is positioned between the output shaft 216 and the rear wheels 58.

The crankshaft 176 extends into the V-belt housing 178 and carries a drive pulley 218. The output shaft 216 carries a driven pulley 220. The drive and driven pulleys 218, 220 both comprise an axially fixed pulley member and an axially movable pulley member that is movable along the respective axis of the crankshaft 176 or the output shaft 216. Together, the pulley members form a V-shaped valley that expands and contracts with changes in engine speed.

An endless transmitter (e.g., a belt or a chain) 222 is wound around the drive pulley 218 and the driven pulley 220. In the illustrated embodiment, the transmitter 222 is a V-type belt and has a V-configuration in section. Normally, the movable pulley member of the drive pulley 218 is urged to stay apart from the fixed pulley member by the bias force of a bias member such as, for example, a spring. The movable pulley member of the driven pulley 220 is urged to stay close to the fixed pulley member by the bias force of a bias member such as, for example, a spring.

Each movable pulley member can move axially against the bias force by a clutch mechanism which is provided on either the pulley 218, 220. The clutch mechanism acts by centrifugal force created when the crankshaft or output shaft turns at a speed higher than a preset speed. The change in diameter of one pulley causes a corresponding change in the other pulley. Thus, both diameters of the drive pulley 218 and the driven pulley 220 vary to automatically change the transmission ratio between the drive pulley 218 and the driven pulley 220 normally in response to the engine speed.

Friction occurs when the belt 222 runs on the pulleys 218, 220, and such friction produces heat that can deteriorate the belt 222. In order to inhibit the heat from deteriorating the belt 222, the transmission 144 has a cooling system that preferably introduce ambient air into the v-belt housing 178 and discharges the air to an external location outside of the housing 178.

With reference to FIGS. 1-3 and 5-9, the V-belt housing 178 preferably has an air inlet port 226 at a rear end and an air outlet port 228 at a front end. An air inlet duct 230 is coupled to the inlet port 226, while an air outlet duct 232 is coupled to the outlet port 228. A downstream end 230a of the inlet duct 230 is joined to the inlet port 226 of the V-belt housing 178. The inlet duct 230 has a horizontal portion 230b and a vertical potion 230c.

The horizontal portion 230b extends generally rearward from the downstream end 230a In the illustrated embodiment, the air inlet port 226 of the V-belt housing 178 is positioned in front of the imaginary rearward, generally vertical plane 86 (FIG. 3) that includes the rearmost end 80 of the seat 68. Thus, a large part of the horizontal portion 230b is positioned between the seat assemblies. The vertical portion 230c extends generally upward from the horizontal portion 230b to a location generally behind the seat back 74, on the left-hand side in the illustrated embodiment. Preferably, the vertical portion 230c generally extends entirely behind the imaginary rearward, generally vertical plane 86 (FIG. 3).

The inlet duct 230 preferably has an inlet opening 233 at its upstream end. The inlet opening 233 faces forward and is disposed at the upper end of the inlet duct 230. The inlet opening 233 preferably is positioned at almost the same elevation as the top surfaces 72a of the seat cushions 72. In the illustrated embodiment, the inlet opening 233 is positioned slightly higher than the recessed portions 72aR of the top surfaces 72a. In this position, the inlet opening 233 can efficiently draw the ambient air that flows generally between the seats 68.

Cooling air is introduced into the V-belt housing 178 through the inlet duct 230 and the air inlet port 226 when the crankshaft 176, the output shaft 216 and the drive and driven pulleys 218, 220 rotate. In some arrangements, one or both of the pulleys can be provided with fan blades to help induce higher speed air flow as the engine speed increases. Other embodiments can provide a ram air type of air flow. Having circulated with the belt chamber of the transmission, the air then is discharged through the outlet port 228 and the outlet duct 232.

In one variation, as shown in FIG. 6, a modified inlet duct 230A can extends toward a location almost the same elevation of the top end of the seat backs 74 and has an inlet opening 233A that is directed rearward. As so arranged, the inlet opening 233A can advantageously draw the air that is not heated by the engine 142.

The outlet duct 232 preferably has a vertical portion 232b and a horizontal portion 232c. A bottom of the illustrated vertical portion 232b slightly turns rearward toward the outlet port 228 of the V-belt housing 178. An upstream end 232a, which is a lower distal end of the outlet duct 232, is joined to the outlet port 228 of the V-belt housing 178. The vertical portion 232b extends generally upward from the upstream end 232a in front of the V-belt housing 178 toward a location higher than a top end of the V-belt housing 178. The horizontal portion 232c preferably defines an uppermost portion of the outlet duct 232. The horizontal portion 232c extends rearward from the vertical section 232b and generally along a bottom surface of one of the seat cushions 72, on the left-hand side in the illustrated embodiment. In other words, the horizontal portion 232c extends close to the seat cushion 72 and generally at the same level as to top of the seat cushions 72. Almost the entire body of the horizontal portion 232c lies concealed between the seat assemblies. The outlet duct 232 preferably has an outlet opening 234 at its downstream end. The outlet opening 234 preferably is directed rearward. The illustrated outlet opening 234 is positioned nearly to the rear end of the associated seat cushion 72.

Figure 8:
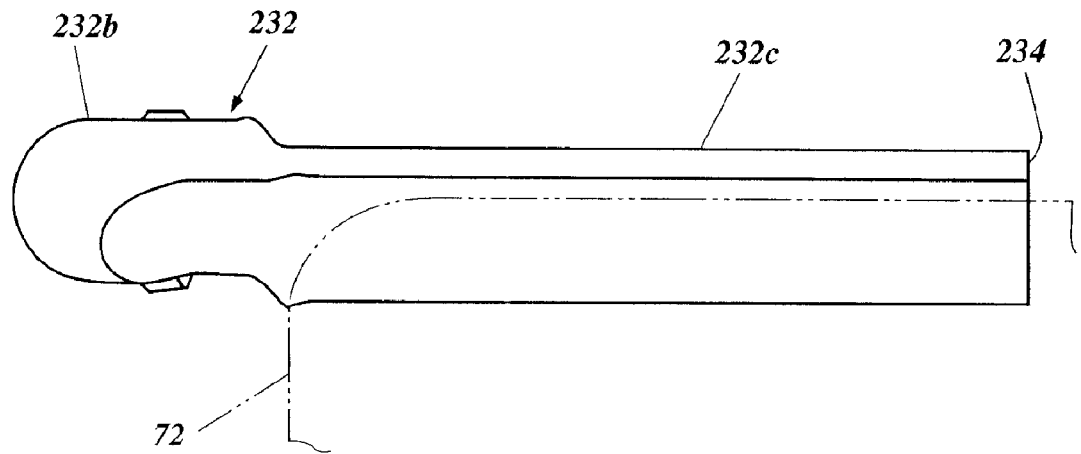
FIG. 8 is a top plan view of an air outlet duct with a portion of the seat shown in phantom.
Figure 9:
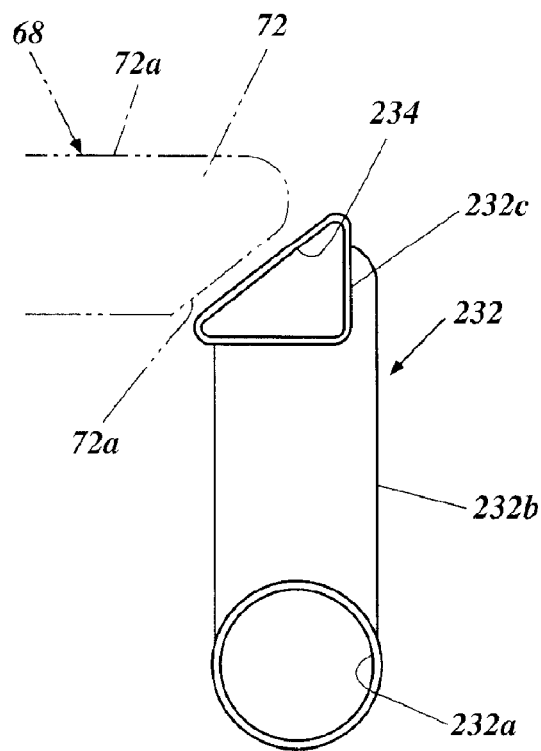
FIG. 9 is a rear view of the air outlet duct of FIG. 8 with a portion of the seat shown in phantom.

As best shown in FIGS. 8 and 9, the horizontal portion 232c of the outlet duct 232 in the illustrated embodiment has a configuration corresponding to a configuration of the associated seat cushion 72. Preferably, the seat cushion 72 has a slant surface 72a on its side such that the seat cushion 72 becomes narrower toward a bottom end from a top end. The horizontal portion 232c of the outlet duct 232 generally has a triangular shape in section with its hypotenuse extending next to the slant surface 72a of the seat cushion 72. Thus, the seat cushion 72 and the horizontal portion 232c of the outlet duct 232 can nest together.

As thus constructed, the ambient air is introduced into the V-belt housing 178 through the inlet duct 230 and is discharged through the outlet duct 232 which the pulleys 218, 220 rotating within the V-belt housing 178. The airflow through the housing 178 prevents the heat from building and thus keeps the belt 222 and the pulleys 218, 220 relatively cool. Belt deterioration due to heat this is reduced and/or slowed.

Because of the arrangement described above, both the inlet opening 233 of the inlet duct 230 and the outlet opening 234 of the outlet duct 232 are positioned at elevations higher than the respective top surfaces 56a, 58a of the wheels 56, 58. Thus, even if the wheels 56, 58 are submerged during use, water will not enter the V-belt housing 178.

The outlet opening 234 of the outlet duct 232 is directed rearward at nearly the rear ends of the seat cushions 72 as described above. The noise in the V-belt housing 178 is channeled rearward and is hardly audible to the driver and/or the passenger. Also, because the inlet opening 233 of the inlet duct 230 and the inlet opening 233A of the modified inlet duct 230A are positioned behind the seat backs 74, any noise associated with the airflow into the intake duct generally will not disturb the driver and/or the passenger. Moreover, further isolation of driver/passenger from such noise is achieved with a rearward facing inlet opening, such as the inlet opening 233A, shown in FIG. 6.

Also, the illustrated horizontal portion 232c of the outlet duct 232 does not lessen the appearance of the off-road vehicle 30, because the horizontal portion 232c lies generally concealed between the seat assemblies. In addition, a large part of the horizontal portion 232c can be placed under one of the seat cushions 72 because of its configuration which corresponds to the slant surface 72a of the seat cushion 72. This feature is useful not only for appearance but also to make the off-road vehicle 30 compact.

With reference to FIGS. 1-3 and 5, the engine output that has been transferred to the output shaft 216 through the V-belt mechanism is transferred to the drive mechanism 146 through the change speed transmission mechanism. This mechanism preferably is configured to provide a parking state, a high speed forward state, a neutral state, a low speed forward state, and a reverse state. The mechanism preferably comprises a suitable gear train that allows an operator to select among at least the above-mentioned operating states. A bevel gear assembly 236 can be coupled with the mechanism.

The mechanism also comprises a shift lever unit 240 that extends from the crankcase 174. The shift lever unit 240 preferably is connected to the rest of the switchover mechanism within the crankcase 174 through a suitable linkage (not shown). The shift lever unit 240 preferably is placed generally within the space defined between the seats 68. The illustrated lever unit 240 is positioned generally at the forward-most portion of the space. Such placement facilitates ease of use.

The shift lever unit 240 preferably comprises a lever 244 and a lever cover 246. The lever 244 preferably is affixed to the frame 32 directly or indirectly for pivotal movement around a fulcrum. In one variation, the shift lever unit 240 can comprise a lever that moves axially. The driver thus can control the change speed mechanism in the crankcase 174 and vary the transmission operating state among at least the parking state, the high speed forward state, the neutral state, the low speed forward state, and the reverse state by operating the lever 244.

Because of the advantageous configuration of the drive train relative to the shift lever unit 240, the shift lever unit 240 is positioned close proximity to the change speed mechanism of the transmission 144. The linkage thus can be short enough to make the switchover mechanism compact and also to improve the feeling that the driver might have when operating the shift lever unit 240.

The output of the change speed mechanism 144b is transferred to the drive system 146 through the bevel gear 236. The forward driveshaft 150 of the drive system 146 is pivotally coupled with a forward differential input shaft (not shown) of the forward differential gear unit 1 19. The forward differential input shaft is connected to the front wheels 56 through a differential mechanism formed within the forward differential gear unit 119. The rear driveshaft 152 is coupled with a rear differential input shaft (not shown) of the rear differential gear unit 154. The rear differential input shaft is coupled with the rear wheels 58 through another differential mechanism formed within the rear differential gear unit 154.

The engine unit 148 can have systems, devices, components and members other than those described above. For example, the illustrated engine 142 employs a starter motor that starts the engine 142.

The off-road vehicle 30 preferably has other devices, components and members. For example, the differentials can be selectively lockable such that the differential function can be eliminated on demand. Moreover, a brake system can be provided to slow or stop rotation of the wheels 56, 58 or another drive train component (e.g., the driveshafts). A brake pedal 270 (FIG. 5) can be disposed next to the accelerator pedal 196 and can be connected to brake units that are coupled with the wheels 56, 58. In some arrangements, the brake units can comprise disk brake configurations. The driver thus can stop the off-road vehicle 30 by operating the brake pedal 270.

In the illustrated arrangement, the engine 142 is located generally rearward of the change speed mechanism including the output shaft 216. Moreover, the engine is positioned generally rearward of, and lower than, the seating area. Thus, heat generated by the engine 142 can be substantially isolated from the driver and/or the passenger, and particularly isolated from the feet of those persons both when seating and when mounting or dismounting from the vehicle. In addition, the cylinder block 158, the cylinder head 160 and the cylinder head cover 170 in this arrangement generally are directed rearward and are positioned generally rearward of the occupants. Thus, it is very unlikely that the engine heat will affect the occupants of the vehicle.

The exhaust system 168 carries a great deal of heat as well while the intake system 164 and the charge former, e.g., the throttle body 182, generally do not generate or conduct much heat. The intake system 164 and the charge former are generally protected from heat carried by the exhaust system 168 because the exhaust system 168 is positioned opposite to the intake system 164 in the illustrated arrangement. Thus, the engine heat and the exhaust heat can be generally isolated from the intake system 164 during forward operation of the off-road vehicle 30. The temperature of the intake air, therefore, is not greatly affected by the heat generated during operation of the off-road vehicle 30 and engine output efficiency can be kept in good condition. Along these lines, placement of a radiator preferably is generally below the air intake such that heat generated in the region of the radiator does not adversely affect engine performance through heating of the air inducted into the engine.

Furthermore, in the illustrated intake system 164, the intake system 164 generally does not extend along a heat generating or conducting surface of the engine 142. Thus, the engine heat is generally isolated from the intake system 164 in this arrangement. Also, the illustrated air cleaner 188 is greatly spaced from the engine 142. As such, any air that is heated by the engine 142 and the exhaust system 168 will not be drawn into the air intake system 164, which improves the engine output efficiency. Additionally, due to the elevated nature of the air inlet and air cleaner 188, water also is very unlikely to be drawn into the intake system 164. Furthermore, because the air cleaner 188 is positioned below the hood 134, water is unlikely to splash its way into the air cleaner.

As illustrated, the exhaust conduits 208 extend along a relatively lower portion of the off-road vehicle 30 in the illustrated arrangement because the exhaust conduits 208 are directed generally downward and rearward instead a wrapping around from a forward or lateral surface of the engine. The exhaust conduits 208, thus, are sufficiently spaced apart from the driver and/or the passenger. As a result, the seats 68 can be positioned closer to the engine 142, which allows a narrower overall construction for the vehicle or a closer mounting of the split seats 68.

Although the present inventions have been described in terms of certain preferred embodiments, other embodiments apparent to those of ordinary skill in the art also are within the scope of these inventions. Thus, various changes and modifications may be made without departing from the spirit and scope of the inventions.

What is claimed is:

1. An off-road vehicle comprising:
   a frame,
   a plurality of wheels arranged to support the frame,
   an internal combustion engine including a crankcase housing a rotatable crankshaft, and a cylinder block connected to the crankcase,
   a transmission arranged to transmit the rotation of the crankshaft to at least one of the wheels,
   a v-belt transmission housing disposed to a lateral side of the crankcase,
   a shift lever disposed forward from the cylinder block and laterally to a side of the v-belt transmission housing, and
   a first seat and a second seat supported by the frame, the first seat and the second seat being arranged side-by-side in a width direction of the vehicle, wherein
   at least a portion of the engine is arranged between the first and second seats as viewed from above the vehicle, and
   the shift lever is arranged between the first seat and the second seat in the width direction of the vehicle, and the shift lever is arranged forward relative to a front edge of the first and second seats.

2. The off-road vehicle as set forth in claim 1, further comprising a lever cover disposed over at least a portion of the shift lever, the lever cover being disposed such that a rear end of the lever cover is positioned rearward relative to the front edge of the first and second seats.

3. The off-road vehicle as set forth in claim 2, wherein the rear end of the lever cover is disposed rearwardly from a forward end of the v-belt transmission housing.

4. The off-road vehicle as set forth in claim 1, wherein at least a portion of the first and second seats overlap with a lever cover of the shift lever when viewed from a side elevational point of view.

5. The off-road vehicle as set forth in claim 1, further comprising an intake air system configured to guide air into the engine, at least a portion of the intake air system extending along a side of at least a portion of a lever cover of the shift lever.

6. The off-road vehicle as set forth in claim 5 wherein the portion of the intake air system overlaps with the portion of the lever cover when viewed from a side elevational point of view.

7. The off-road vehicle as set forth in claim 1, further comprising an air intake system configured to guide air into the engine, at least a portion of the air intake system being disposed between the shift lever and the cylinder block.

8. The off-road vehicle as set forth in claim 7, wherein the cylinder block is disposed toward a rear end of the engine and the shift lever is disposed toward a front end of the engine.

9. The off-road vehicle as set forth in claim 8, wherein the cylinder block is tilted rearwardly away from the front end of the engine.

10. The off-road vehicle as set forth in claim 7, wherein the portion of the air intake system comprises an accumulator.

11. The off-road vehicle as set forth in claim 1, wherein the shift lever is disposed close to a forward end of the first and second seats.

12. The off-road vehicle as set forth in claim 1 wherein the first and second seats are disposed rearward of the shift lever and forward relative to the cylinder block.

13. The off-road vehicle as set forth in claim 1, wherein
   a front edge of the v-belt transmission housing is disposed forward relative to the front edge of the first and second seats; and
   at least a portion of the shift lever is disposed rearward relative to the front edge of the v-belt transmission housing.

14. An off-road vehicle comprising:
   a frame,
   a plurality of wheels arranged to support the frame,
   an internal combustion engine including a crankcase housing a rotatable crankshaft, and a cylinder block connected to the crankcase,
   a transmission arranged to transmit the rotation of the crankshaft to at least one of the wheels,
   a v-belt transmission housing disposed to a lateral side of the crankcase,
   a shift lever disposed forward relative to the cylinder block and laterally to a side of the v-belt transmission housing,
   at least one seat supported by the frame, and
   an air intake system configured to guide air into the engine at least a portion of the air intake system being disposed higher than a seating surface of the at least one seat and lower than an upper end of the shift lever.

15. An off-road vehicle comprising:
   a frame;
   at least four wheels supporting the frame;
   an internal combustion engine including a crankcase housing a rotatable crankshaft, and a cylinder block connected to the crankcase, the cylinder block being disposed toward a rearward end of the engine;
   at least a first seat supported by the frame and disposed on a left side of the internal combustion engine;
   at least a second seat supported by the frame and disposed on a right side of the engine;
   a transmission configured to transmit the rotation of the crankshaft to at least one of the wheels, the transmission comprising a v-belt arrangement and a v-belt transmission housing disposed to a lateral side of the crankcase, the transmission also including a change speed transmission mechanism configured to shift the transmission between at least a parking state, a neutral state, a forward state, and a reverse state, the change speed transmission mechanism being disposed at a forward end of the engine;

an exhaust system configured to guide exhaust gases away from the engine; and a shift lever being operatively connected to the change speed transmission mechanism, the shift lever being disposed at the forward end of the engine over the change speed transmission mechanism and between the first and second seats; wherein at least a portion of the engine is arranged between the at least one first and second seats as viewed from above the vehicle;

the shift lever is arranged between the at least one first and second seats in a width direction of the vehicle; and the shift lever is arranged forward relative to a front edge of the at least one first and second seats.

16. The off-road vehicle as set forth in claim 15, wherein the shift lever is supported by the frame.

17. The off-road vehicle as set forth in claim 15, further comprising a shift lever cover, the at least one first and second seats overlapping the shift lever cover in a side elevational point of view.

18. The off-road vehicle as set forth in claim 15, further comprising an intake air system configured to guide air into the engine, the intake air system including a throttle body, the throttle body being disposed between the shift lever and the cylinder block.

19. The off-road vehicle as set forth in claim 15, wherein
a front edge of the v-belt transmission housing is disposed forward relative to the front edge of the at least one first and second seats; and
at least a portion of the shift lever is disposed rearward relative to the front edge of the v-belt transmission housing.

* * * * *